United States Patent
Kababik et al.

(10) Patent No.: US 11,174,377 B2
(45) Date of Patent: Nov. 16, 2021

(54) HIGH PROCESSABILITY POLYETHYLENE COMPOSITIONS FOR INJECTION MOLDED ARTICLES

(71) Applicant: Dow Global Technologies LLC, Midland, MI (US)

(72) Inventors: David W. Kababik, Whitehouse, NJ (US); Shannon E. Hunt, Carmel, IN (US); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 40 days.

(21) Appl. No.: 16/329,940

(22) PCT Filed: Sep. 29, 2017

(86) PCT No.: PCT/US2017/054216
§ 371 (c)(1),
(2) Date: Mar. 1, 2019

(87) PCT Pub. No.: WO2018/064435
PCT Pub. Date: Apr. 5, 2018

(65) Prior Publication Data
US 2020/0399452 A1      Dec. 24, 2020

Related U.S. Application Data

(60) Provisional application No. 62/402,286, filed on Sep. 30, 2016.

(51) Int. Cl.
*C08L 23/06*      (2006.01)

(52) U.S. Cl.
CPC .......... *C08L 23/06* (2013.01); *C08L 2205/025* (2013.01); *C08L 2207/066* (2013.01)

(58) Field of Classification Search
CPC .......... C08L 23/04; C08L 23/06; C08L 23/08; C08L 2205/025
See application file for complete search history.

(56) References Cited

U.S. PATENT DOCUMENTS

| | | |
|---|---|---|
| 4,076,698 A | 2/1978 | Anderson et al. |
| 5,015,511 A | 5/1991 | Treybig et al. |
| 5,082,902 A | 1/1992 | Gurevitch et al. |
| 5,102,955 A | 4/1992 | Calabro et al. |
| 5,272,236 A | 12/1993 | Lai et al. |
| 5,278,272 A | 1/1994 | Lai et al. |
| 5,508,359 A | 4/1996 | Pham |
| 5,844,045 A | 12/1998 | Kolthammer et al. |
| 6,008,262 A | 12/1999 | McKay et al. |
| 6,319,979 B1 | 11/2001 | Dubois et al. |
| 6,649,698 B1 | 11/2003 | Mehta |
| 6,812,289 B2 | 11/2004 | Van Dun et al. |
| 7,135,526 B2 | 11/2006 | Farley et al. |
| 8,207,248 B2 | 6/2012 | Haley et al. |
| 8,247,065 B2 | 8/2012 | Best et al. |
| 8,497,330 B2 | 7/2013 | Hussein et al. |
| 9,074,082 B2 | 7/2015 | Wang et al. |
| 2004/0054097 A1 | 3/2004 | Maehling et al. |
| 2014/0255674 A1 | 9/2014 | Tice et al. |
| 2015/0299526 A1 | 10/2015 | Gray et al. |
| 2015/0353715 A1 | 12/2015 | Wang |

FOREIGN PATENT DOCUMENTS

| | | | |
|---|---|---|---|
| EP | 2354183 A1 | * | 8/2011 |
| JP | 2014240498 A | | 12/2014 |
| WO | 9308221 A2 | | 4/1993 |
| WO | 2009086251 A1 | | 7/2009 |
| WO | 2011126029 A1 | | 10/2011 |
| WO | 2015135113 A1 | | 9/2015 |
| WO | WO2016066619 A1 | * | 5/2016 |

* cited by examiner

*Primary Examiner* — Irina S Zemel
*Assistant Examiner* — Jeffrey S Lenihan
(74) *Attorney, Agent, or Firm* — Dinsmore & Shohl LLP

(57) ABSTRACT

The present disclosure includes a polyethylene composition that may include a first polyethylene resin having a density of from 0.915 g/cc to 0.970 g/cc and a melt index ($I_2$) from 10 g/10 min to 200 g/10 min, when measured according to ASTM D1238 at 190° C. and 2.16 kg load, and a second polyethylene resin having a density of from 0.860 g/cc to 0.930 g/cc and a melt index ($I_2$) of from 400 g/10 min to 2000 g/10 min. The density of the first polyethylene resin may be greater than the density of the second polyethylene resin and the first polyethylene resin, the second polyethylene resin, or both are copolymers of ethylene monomer and at least one α-olefin comonomer, the α-olefin comonomer including $C_3$-$C_{12}$ α-olefins. Injection molded articles produced from the polyethylene composition are also disclosed herein.

20 Claims, No Drawings

HIGH PROCESSABILITY POLYETHYLENE COMPOSITIONS FOR INJECTION MOLDED ARTICLES

CROSS REFERENCE TO RELATED APPLICATION

This application claims priority to U.S. Provisional Patent Application Ser. No. 62/402,286 filed Sep. 30, 2016, which is incorporated by reference herein in its entirety.

TECHNICAL FIELD

Embodiments of the present disclosure generally relate to polyethylene compositions, and more specifically to polyethylene compositions for injection molded articles.

BACKGROUND

Today, many high-volume, thin-walled polymer structures, such as container lids for example, are made from polyethylene using injection molding processes. High-cavitation injection molds have multiple mold cavities that may be simultaneously filled with molten polymer during an injection molding cycle and are used to produce multiple units per each injection molding cycle, which increases the throughput of the injection molding process as measured in units per time. Improper and/or incomplete filling or packing of one or more of the mold cavities of a high-cavitation injection mold can be troublesome, leading to warpage of parts. Remedying part warpage due to improper or incomplete packing of one or more mold cavities may impose production penalties, which reduce the efficiency and throughput of the injection molding process.

SUMMARY

Accordingly, ongoing needs exist for polyethylene compositions having improved processability for making injection molded articles.

According to one or more embodiments, a polyethylene composition is disclosed that may comprise a first polyethylene resin having a density of from 0.915 g/cc to 0.970 g/cc and a melt index ($I_2$) from 10 g/10 min to 200 g/10 min, when measured according to ASTM D1238 at 190° C. and 2.16 kg load. The polyethylene composition may further comprise a second polyethylene resin having a density of from 0.860 g/cc to 0.930 g/cc and a melt index ($I_2$) of from 400 g/10 min to 2000 g/10 min. The density of the first polyethylene resin may be greater than the density of the second polyethylene resin and the first polyethylene resin, the second polyethylene resin, or both are copolymers of ethylene monomer and at least one α-olefin comonomer, the α-olefin comonomer including $C_3$-$C_{12}$ α-olefins.

According to another embodiment, an injection molded article is disclosed that may comprise a polyethylene composition having a first polyethylene resin having a density of from 0.915 g/cc to 0.970 g/cc and a melt index ($I_2$) from 10 g/10 min to 200 g/10 min, when measured according to ASTM D1238 at 190° C. and 2.16 kg load. The polyethylene composition may further comprise a second polyethylene resin having a density of from 0.860 g/cc to 0.930 g/cc and a melt index ($I_2$) of from 400 g/10 min to 2000 g/10 min. The density of the first polyethylene resin may be greater than the density of the second polyethylene resin and the first polyethylene resin, the second polyethylene resin, or both are copolymers of ethylene monomer and at least one α-olefin comonomer, the α-olefin comonomer including $C_3$-$C_{12}$ α-olefins.

Additional features and advantages of the described embodiments will be set forth in the detailed description which follows, and in part will be readily apparent to those skilled in the art from that description or recognized by practicing the described embodiments, including the detailed description which follows, and the claims.

DETAILED DESCRIPTION

Embodiments of the present disclosure are directed to polyethylene compositions having improved processability in injection molding processes for making injection molded articles. Embodiments are also directed to articles made from the polyethylene compositions disclosed herein.

As used herein, the term "polyethylene resin" refers to a polymer resin having at least an ethylene monomer. As used herein, the term "polyethylene composition" refers to a blend or mixture of two or more polyethylene resins.

As used herein, melt index ($I_2$) is a measure of the extrusion flow rate of a polymer and is generally measured using ASTM D1238 at a temperature of 190° C. and 2.16 kg of load.

As used herein, the Molecular Weight Distribution (MWD) of a polymer is defined as the quotient Mw/Mn, where Mw is a weight average molecular weight of the polymer and Mn is a number average molecular weight of the polymer. Test methods for determining MWDs of the polymer compositions are subsequently described in this disclosure.

As used in this disclosure, the term "polymer blend" refers to a mixture of two or more different types of polymers in which the individual molecules of each different polymer are interspersed with the molecules of every other polymer in the mixture.

As used herein, the term "molten polymer" refers to a polymer having a temperature above a melt temperature of the polymer such that the polymer is at least partially flowable.

As used herein, the term "processability" refers to an ability to inject the molten polyethylene composition into an injection mold to produce an acceptable injection molded article under favorable operating conditions. Aspects of the "processability" of the polyethylene compositions may relate to the rheology and flow characteristics of the polyethylene compositions, as reflected in the melt index ($I_2$) of the composition, and may impact injection of the polyethylene compositions into the injection mold and filling of the injection mold cavities.

A typical injection molding system or machine may generally include a feed hopper that feeds polymer pellets, granules, or other solid structures to a pressure mechanism positioned within a pressure chamber. The pressure mechanism may be a reciprocating screw, twin screw, or ram-type pressure mechanism. The injection molding system may also include an injection mold, such as a high cavitation injection mold, having one or more cavities. The injection mold may be fluidly connected to the outlet of the pressure mechanism. The injection molding system may also include a hot runner, which may be an assembly of heated components used as a channel to deliver the molten polymer composition into the cavities of the injection mold. The hot runner may be positioned between the pressure mechanism and the injection mold.

In a typical injection molding process, a polymer composition, in the form of pellets, granules, or other solid structures, may be added to a feed hopper of the injection molding machine. The feed hopper feeds the polymer composition to the pressure mechanism, which applies heat and pressure to the polymer composition to transition the solid polymer composition into a molten polymer. For an injection molding process employing one or more reciprocating screws, the reciprocating screws may accomplish additional mixing and blending of multiple polymer resins and/or additives of the molten polymer composition within the chamber.

The molten polymer may be transferred into the mold cavities of the mold by increasing the pressure of the molten polymer to an injection pressure using the pressure mechanism. For an injection molding machine/system having a hot runner, the molten polymer may be transferred to the hot runner before being transfer into the mold cavities. The injection pressure may cause the molten plastic to flow into the mold cavities and fill the mold cavities. The injection pressure may be maintained for a period of time (fill time) to pack the molten polymer into the cavities such that the polymer entirely fills each of the mold cavities of the mold. The pressure may then be reduced to a hold pressure sufficient to maintain the molten polymer in the mold cavities. The injection mold is maintained at a temperature less than the temperature of the molten polymer. The molten polymer may be maintained in the mold cavities at the hold pressure for a hold time, during which the molten polymer in each mold cavity may solidify into a solid article. Once the molten polymer transitions back into a solid polymer, the mold may be released and the resulting polymer articles may be ejected from each of the mold cavities.

Many injection molding processes use high cavitation molds having a plurality of mold cavities, each of which must be filled with the molten polymer during each cycle of the injection molding process. Failure to completely fill and/or sufficiently pack each mold cavity of the mold with molten polymer during a cycle of the injection molding process may result in warpage of one or more units released from the injection mold. Other defects in the finished articles may result from incomplete filling and packing of the mold cavities of a high cavitation injection mold. The resulting defects may result in decreased productivity of the injection molding process and increased waste. Problems may be further exacerbated when producing pigmented articles, depending on whether the color is formulated into the masterbatch or added as a liquid concentrate. Without being bound by theory, some pigments can alter the rate at which polymers crystallize, leading to issues in part sizing and part warpage due to molded in stresses caused by variations in molded density across the part. Additionally, material can prematurely solidify in the mold cavity resulting in incomplete parts commonly referred to as a "short shot."

Several approaches to addressing incomplete filling of mold cavities, warpage elimination, and other related defects have been used. In one approach, the injection molding operation may be temporarily halted and the offending mold cavities may be shut off. In this approach, shutting off one or more offending cavities may preclude the full use of all of the mold cavities, which may reduce the overall throughput of the injection molding process as measured in units per time. In another approach, the hold time and/or the cooling time may be increased to reduce warpage. However, increasing the hold time and/or cooling time may increase the cycle time, thereby reducing the throughput of the injection molding process. In another approach, the injection pressure may be increased to facilitate complete filing of each of the mold cavities. However, increasing the injection pressure may increase wear on the injection molding system and may likely result in some articles or some portions of articles being sharper than desired. Additionally, increasing the injection pressure may cause "flash," which refers to a thin film of excess polymer that may escape from the mold cavity out from between the mating surfaces of the mold sections. Generating "flash" may result in material loss in the form of waste and may necessitate additional process steps to remove the flash from the articles or the mold. Increasing the injection pressure may also increase the energy costs of the injection molding process. In another approach, the transfer point from injection pressure to hold pressure on injection may be increased, which may promote additional packing of the polymer into the mold cavities but may also increase cycle time. As discussed, each of these approaches typically may result in production penalties (i.e., reductions in productivity of the injection molding process), whether through an increase in cycle time, a reduction in the articles per cycle, or increased material, excessive machine/mold wear and higher energy costs.

The polyethylene compositions disclosed herein may include a first polyethylene resin and a second polyethylene resin having a density less than a density of the first polyethylene resin and a melt index ($I_2$) that is greater than the melt index ($I_2$) of the first polyethylene resin. The first polyethylene resin may have a density from 0.915 grams per centimeter cubed (g/cc) to 0.970 g/cc and a melt index ($I_2$) from 10 g/10 min to 200 g/10 min, when measured according to ASTM D1238 at 190 degrees Celsius (° C.) and 2.16 kilograms (kg) load. The second polyethylene resin may have a density from 0.860 g/cc to 0.930 g/cc and a melt index ($I_2$) from 400 g/10 min to 2000 g/10 min. The polyethylene compositions disclosed herein may have enhanced processability, which may reduce the warpage in problematic mold cavities of high cavitation injection molds and may restore and/or enhance productivity of injection molding processes.

First Polyethylene Resin

The first polyethylene resin may be a copolymer of ethylene comonomer and at least one α-olefin comonomer (i.e., alpha olefin comonomer). Suitable α-olefin comonomers may include those containing 3 to 20 carbon atoms ($C_3$-$C_{20}$ α-olefins). In some embodiments, the α-olefin comonomer may be a $C_3$-$C_{20}$ α-olefin, a $C_3$-$C_{12}$ α-olefin, a $C_3$-$C_{10}$ α-olefin, a $C_3$-$C_8$ α-olefin, a $C_4$-$C_{20}$ α-olefin, a $C_4$-$C_{12}$ α-olefin, a $C_4$-$C_{10}$ α-olefin, or a $C_4$-$C_8$ α-olefin. In one or more embodiments, the first polyethylene resin may be a copolymer of ethylene comonomer and one or more co-monomers selected from propene, 1-butene, 1-pentene, 4-methyl-1-pentene, 1-hexene, 1-septene, 1-octene, 1-nonene, and 1-decene. In one or more embodiments, the first polyethylene resin may be a copolymer of ethylene comonomer and 1-hexene comonomer. In one or more embodiments, the first polyethylene resin may be a copolymer of ethylene comonomer and 1-octene comonomer. A weight percent of ethylene in the first polyethylene resin is greater than 50 wt. % in one or more embodiments, or greater than 60 wt. % in other embodiments, or greater than 70 wt. % in yet other embodiments, or greater than 80 wt. % in yet other embodiments. Conversely, a weight percent of the α-olefin comonomer in the first polyethylene resin is less than 50 wt. % in one or more embodiments, or less than 40 wt. % in other embodiments, or less than 30 wt. % in yet other embodiments, or less than 20 wt. % in yet other embodiments.

The first polyethylene resin may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the first polyethylene resin is made in a gas-phase or slurry process such as that described in U.S. Pat. No. 8,497,330, which is herein incorporated by reference in its entirety. The first polyethylene resin may also be made by a high pressure, free-radical polymerization process. Methods for preparing the first polyethylene resin by high pressure, free radical polymerization can be found in U.S. 2004/0054097, which is herein incorporated by reference in its entirety, and can be carried out in an autoclave or tubular reactor as well as any combination thereof. Details and examples of a solution polymerization of ethylene monomer and one or more α-olefin comonomers in the presence of a Ziegler-Natta catalyst are disclosed in U.S. Pat. Nos. 4,076,698 and 5,844,045, which are incorporated by reference herein in their entirety. The catalysts used to make the first polyethylene resin described herein may include Ziegler-Natta, metallocene, constrained geometry, single site catalysts, or chromium-based catalysts. Exemplary suitable first polyethylene resins may include resins sold by The Dow Chemical Company, such as, DNDA-1081 NT 7, DNDA-1082 NT 7, DNDA-1077 NT 7, DMDA-8007 NT 7, DMDA-8965 NT 7, or DMDA-6400 NT 7; resins sold by LyondellBasell Industries (Houston, Tex.), such as, ALATHON™ H4250, H4837, or H5057; resins sold by The ExxonMobil Chemical Company (Houston, Tex.), such as, LLDPE LL5252.09 or 6201.19, or HDPE HD 6733.17; resins sold by Chevron Phillips Chemical Company LP, such as, MARLEX™ 1412, 9018, or 9035. Other exemplary first polyethylene resins are described in U.S. 2014/0255674, which is herein incorporated by reference in its entirety.

The first polyethylene resin may have a density from 0.915 g/cc to 0.970 g/cc, from 0.915 g/cc to 0.960 g/cc, from 0.915 g/cc to 0.950 g/cc, from 0.915 g/cc to 0.940 g/cc, from 0.915 g/cc to 0.935 g/cc, from 0.920 g/cc to 0.970 g/cc, from 0.920 g/cc to 0.960 g/cc, from 0.920 g/cc to 0.950 g/cc, from 0.920 g/cc to 0.940 g/cc, from 0.920 g/cc to 0.935 g/cc, from 0.925 g/cc to 0.970 g/cc, from 0.925 g/cc to 0.960 g/cc, from 0.925 g/cc to 0.950 g/cc, from 0.925 g/cc to 0.940 g/cc, from 0.925 g/cc to 0.935 g/cc, from 0.928 g/cc to 0.970 g/cc, from 0.928 g/cc to 0.960 g/cc, from 0.928 g/cc to 0.950 g/cc, from 0.928 g/cc to 0.940 g/cc, from 0.928 g/cc to 0.935 g/cc, from 0.935 g/cc to 0.970 g/cc, from 0.935 g/cc to 0.960 g/cc, from 0.935 g/cc to 0.950 g/cc, from 0.935 g/cc to 0.940 g/cc, from 0.940 g/cc to 0.960 g/cc, or from 0.915 g/cc to 0.928 g/cc. The density of the first polyethylene resin is measured in accordance with ASTM D792. In one or more embodiments, the first polyethylene resin may have a density from 0.920 g/cc to 0.940 g/cc. In one or more embodiments, the first polyethylene resin may have a density of from 0.928 g/cc to 0.935 g/cc.

The first polyethylene resin may have a melt index ($I_2$), which is measured according to ASTM D1238 at 190° C. and 2.16 kg load, of from 10 grams per 10 minutes (g/10 min) to 200 g/10 min, from 10 g/10 min to 180 g/10 min, from 10 g/10 min to 150 g/10 min, from 10 g/10 min to 100 g/10 min, from 10 g/10 min to 50 g/10 min, from 20 g/10 min to 200 g/10 min, from 20 g/10 min to 180 g/10 min, from 20 g/10 min to 150 g/10 min, from 20 g/10 min to 100 g/10 min, from 20 g/10 min to 50 g/10 min, from 30 g/10 min to 200 g/10 min, from 30 g/10 min to 180 g/10 min, from 30 g/10 min to 150 g/10 min, from 30 g/10 min to 100 g/10 min, from 50 g/10 min to 200 g/10 min, from 50 g/10 min to 180 g/10 min, or from 50 g/10 min to 100 g/10 min. In one or more embodiments, the first polyethylene resin may have a melt index ($I_2$) of from 10 g/10 min to 200 g/10 min. In one or more other embodiments, the first polyethylene resin may have a melt index ($I_2$) of from 20 g/10 min to 180 g/10 min. In one or more embodiments, the first polyethylene resin may have a melt index ($I_2$) of from 50 g/10 min to 180 g/10 min.

The first polyethylene resin may have a molecular weight distribution (MWD or Mw/Mn) of from 2 to 5, from 2 to 4.75, from 2 to 4.5, from 2.25 to 5, from 2.25 to 4.75, from 2.25 to 4.5, from 2.5 to 5, from 2.5 to 4.75, from 2.5 to 4.5, from 3 to 5, from 3 to 4.75, or from 3 to 4.5. In one or more embodiments, the first polyethylene resin may have a MWD of from 3 to 5. Mw is the weight average molecular weight and Mn is the number average molecular weight, both of which may be measured by gel permeation chromatography (GPC).

In one or more embodiments, the first polyethylene resin may include one or more of high density polyethylene (HDPE), medium density polyethylene (MDPE), low density polyethylene (LDPE), linear low density polyethylene (LLDPE), very low density polyethylene (VLDPE), another polymer or copolymer containing at least an ethylene monomer, or combinations thereof. In one or more embodiments, the first polyethylene resin may be a LLDPE.

Second Polyethylene Resin

The second polyethylene resin may also be a copolymer of ethylene comonomer and at least one α-olefin comonomer. Suitable α-olefin comonomers may include those containing from 3 to 20 carbon atoms ($C_3$-$C_{20}$ α-olefins). In some embodiments, the α-olefin comonomer may be a $C_3$-$C_{20}$ α-olefin, a $C_3$-$C_{12}$ α-olefin, a $C_3$-$C_{10}$ α-olefin, a $C_3$-$C_8$ α-olefin, a $C_4$-$C_{20}$ α-olefin, a $C_4$-$C_{12}$ α-olefin, a $C_4$-$C_{10}$ α-olefin, or a $C_4$-$C_8$ α-olefin. In one or more embodiments, the second polyethylene resin may be a copolymer of ethylene comonomer and one or more co-monomers selected from propene, 1-butene, 1-pentene, 4-methyl-1-pentene, 1-hexene, 1-septene, 1-octene, 1-nonene, and 1-decene. In one or more embodiments, the second polyethylene resin may be a copolymer of ethylene comonomer and 1-hexene comonomer. In one or more embodiments, the second polyethylene resin may be a copolymer of ethylene comonomer and 1-octene comonomer. A weight percent of ethylene in the first polyethylene resin is greater than 50 wt. % in one more embodiments, or greater than 60 wt. % in other embodiments, or greater than 70 wt. % in yet other embodiments, or greater than 80 wt. % in yet other embodiments. Conversely, a weight percent of the α-olefin comonomer in the first polyethylene resin is less than 50 wt. % in one or more embodiments, or less than 40 wt. % in other embodiments, or less than 30 wt. % in yet other embodiments, or less than 20 wt. % in yet other embodiments.

The second polyethylene resin has a density that is less than the density of the first polyethylene resin. The second polyethylene resin may have a density from 0.860 g/cc to 0.930 g/cc, from 0.860 g/cc to 0.915 g/cc, from 0.860 g/cc to 0.900 g/cc, from 0.860 g/cc to 0.890 g/cc, from 0.865 g/cc to 0.930 g/cc, from 0.865 g/cc to 0.915 g/cc, from 0.865 g/cc to 0.900 g/cc, from 0.865 g/cc to 0.890 g/cc, from 0.870 g/cc to 0.930 g/cc, from 0.870 g/cc to 0.915 g/cc, from 0.870 g/cc to 0.900 g/cc, or from 0.870 g/cc to 0.890 g/cc. The density of the second polyethylene resin is measured in accordance with ASTM D792. In one or more embodiments, the second polyethylene resin may have a density of from 0.860 g/cc to 0.930 g/cc. In one or more embodiments, the second polyethylene resin may have a density of from 0.860 g/cc to 0.915 g/cc. In one or more embodiments, the second polyethylene may have a density of from 0.870 g/cc to 0.915 g/cc.

While having a lower density than the first polyethylene resin, the second polyethylene resin may have a greater melt index ($I_2$) than the first polyethylene resin. The second polyethylene resin may have a melt index ($I_2$), which is measured according to ASTM D1238 at 190° C. and 2.16 kg load, from 400 g/10 min to 2000 g/10 min, from 400 g/10 min to 1750 g/10 min, from 400 g/10 min to 1500 g/10 min, from 400 g/10 min to 1250 g/10 min, from 500 g/10 min to 2000 g/10 min, from 500 g/10 min to 1750 g/10 min, from 500 g/10 min to 1500 g/10 min, from 500 g/10 min to 1250 g/10 min, from 600 g/10 min to 2000 g/10 min, from 600 g/10 min to 1750 g/10 min, from 600 g/10 min to 1500 g/10 min, from 600 g/10 min to 1250 g/10 min, from 400 g/10 min to 600 g/10 min, from 400 g/10 min to 500 g/10 min, or from 500 g/10 min to 600 g/10 min. In one or more embodiments, the second polyethylene resin may have a melt index ($I_2$) that is greater than the melt index ($I_2$) of the first polyethylene resin. In one or more embodiments, the second polyethylene resin may have a melt index ($I_2$) of from 400 g/10 min to 2000 g/10 min. In one or more embodiments, the second polyethylene resin may have a melt index ($I_2$) of from 500 g/10 min to 1250 g/10 min.

The second polyethylene resin may have a MWD of from 1 to 3.5, from 1 to 3.25, from 1 to 3, from 1 to 2.75, from 1 to 2.5, from 1.5 to 3.5, from 1.5 to 3.25, from 1.5 to 3, from 1.5 to 2.75, from 1.5 to 2.5, from 2 to 3.5, from 2 to 3.25, from 2 to 3, from 2 to 2.75, from 2 to 2.5, from 2.5 to 3.5, from 2.5 to 3.25, from 2.5 to 3, from 2.75 to 3.5, or from 2.75 to 3.25. In one or more embodiments, the second polyethylene resin may have a MWD of from 1 to 3.5. In one or more embodiments, the second polyethylene resin may have a MWD of from 1 to 3. In one or more embodiments, the second polyethylene resin may have a MWD of less than 3.5, or less than 3.0 in other embodiments.

In one or more embodiments, the second polyethylene resin may be include one or more of a linear low density polyethylene (LLDPE), a very low density polyethylene (VLDPE), an ultra-low density polyethylene (ULDPE), or other polymer or copolymer comprising at least an ethylene monomer. In one or more embodiments, the second polyethylene resin may be a polyolefin elastomer or polyolefin plastomer having at least an ethylene monomer. In one or more embodiments, the second polyethylene resin may be a polyolefin elastomer, a non-limiting example of which may include AFFINITY' GA-1950, a polyolefin elastomer formulation supplied by The Dow Chemical Company, Midland, Mich.

The second polyethylene resin may be prepared by polymerization of ethylene and one or more α-olefin comonomers in the presence of one or more catalysts, such as a Ziegler-Natta catalyst, a Phillips catalyst, metallocene catalyst, a constrained geometry complex (CGC) catalyst, biphenyl phenol (BPP) complex catalyst, or combinations of these. In some embodiments, the second polyethylene resin may be prepared by polymerizing ethylene and one or more α-olefin comonomers in the presence of one or more constrained geometry complex (CGC) catalysts. The second polyethylene resin may be a homogeneous linear or substantially linear ethylene/α-olefin interpolymer. Exemplary processes for making the homogeneous linear or substantially linear ethylene/α-olefin interpolymers may be found in U.S. Pat. Nos. 6,008,262 and 6,319,979 (see, e.g., polymerization details for polymers B and E in the Examples section). U.S. Pat. Nos. 6,008,262 and 6,319,979 are incorporated by reference herein in their entirety. Further information and examples of CGC catalysts for polymerization of ethylene monomer with one or more α-olefin comonomers are provided in U.S. Pat. Nos. 5,272,236, 5,278,272, and 6,812,289 and WO Publication No. 93/08221, which are all incorporated herein by reference in their entirety.

Polyethylene Composition

As previously described, the polyethylene compositions may include the first polyethylene resin and the second polyethylene resin. A weight percent of the first polyethylene resin in the polyethylene composition may be greater than a weight percent of the second polyethylene resin. The weight percent of the first polyethylene resin in the polyethylene composition may be from 70 weight percent (wt. %) to 98 wt. %, from 70 wt. % to 97.5 wt. %, from 70 wt. % to 97 wt. %, from 70 wt. % to 95 wt. %, from 80 wt. % to 98 wt. %, from 80 wt. % to 97.5 wt. %, from 80 wt. % to 97 wt. %, from 80 wt. % to 95 wt. %, from 85 wt. % to 98 wt. %, from 85 wt. % to 97.5 wt. %, from 85 wt. % to 97 wt. %, from 85 wt. % to 95 wt. %, 90 wt. % to 98 wt. %, from 90 wt. % to 97.5 wt. %, from 90 wt. % to 97 wt. %, from 90 wt. % to 95 wt. %, from 95 wt. % to 98 wt. %, from 95 wt. % to 97.5 wt. %, or from 95 wt. % to 97 wt. %. In one or more embodiments, the weight percent of the first polyethylene resin in the polyethylene composition may be from 80 wt. % to 98 wt. %. In one or more embodiments, the weight percent of the first polyethylene resin in the polyethylene composition may be from 85 wt. % to 97.5 wt. %. In one or more embodiments, the weight percent of the first polyethylene resin in the polyethylene composition may be from 90 wt. % to 97.5 wt. %.

The weight percent of the second polyethylene resin in the polyethylene composition may be less than the weight percent of the first polyethylene resin in the polyethylene composition. The weight percent of the second polyethylene resin in the polyethylene composition may be from 2 wt. % to 30 wt. %, from 2 wt. % to 20 wt. %, from 2 wt. % to 15 wt. %, from 2 wt. % to 10 wt. %, from 2 wt. % to 5 wt. %, from 2.5 wt. % to 30 wt. %, from 2.5 wt. % to 20 wt. %, from 2.5 wt. % to 15 wt. %, from 2.5 wt. % to 10 wt. %, from 2.5 wt. % to 5 wt. %, from 3 wt. % to 30 wt. %, from 3 wt. % to 20 wt. %, from 3 wt. % to 15 wt. %, from 3 wt. % to 10 wt. %, from 3 wt. % to 5 wt. %, from 5 wt. % to 30 wt. %, from 5 wt. % to 20 wt. %, from 5 wt. % to 15 wt. %, or from 5 wt. % to 10 wt. %. In one or more embodiments, the weight percent of the second polyethylene resin in the polyethylene composition may be from 2 wt. % to 20 wt. %. In one or more embodiments, the weight percent of the second polyethylene resin in the polyethylene composition may be from 2.5 wt. % to 15 wt. %. In one or more embodiments, the weight percent of the second polyethylene resin in the polyethylene composition may be from 2.5 wt. % to 10 wt. %.

A weight ratio of the second polyethylene resin to the first polyethylene resin in the polyethylene compositions may be from 2:98 to 30:70, from 2:98 to 20:80, from 2:98 to 15:85, from 2:98 to 10:90, from 2:98 to 5:95, from 2.5:97.5 to 30:70, from 2.5:97.5 to 20:80, from 2.5:97.5 to 15:85, from 2.5:97.5 to 10:90, from 2.5:97.5 to 5:95, from 3:97 to 30:70, from 3:97 to 20:80, from 3:97 to 15:85, from 3:97 to 10:90, from 3:97 to 5:95, from 5:95 to 30:70, from 5:95 to 20:80, from 5:95 to 15:85, or from 5:95 to 10:90. In one or more embodiments, the weight ratio of the second polyethylene resin to the first polyethylene resin in the polyethylene composition may be from 2:98 to 20:80. In one or more embodiments, the weight ratio of the second polyethylene resin to the first polyethylene resin in the polyethylene composition may be from 2.5:97.5 to 15:85. In one or more embodiments, the weight ratio of the second polyethylene resin to the first polyethylene resin in the polyethylene composition may be from 2.5:97.5 to 10:90.

The polyethylene composition may optionally include one or more additional components or additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, processing stabilizers, mold release agents, UV stabilizers, anti-blocks, slip agents, tackifiers, fire retardants, anti-microbial agents, odor reducer agents, anti-fungal agents, and combinations thereof. In one or more embodiments, the polyethylene composition may comprise one or more of a colorant, an antioxidant, an antistatic agent, a processing stabilizer, or a mold release agent. Various amounts are contemplated for these additional optional additives. In one or more embodiments, the polyethylene composition may include from 0.01 wt. % to 10 wt. %, or from 1 wt. % to 10 wt. % of the additional optional additives.

The first polyethylene resin and the second polyethylene resin, as well as any additives, may be combined into the polyethylene composition disclosed herein through one or more processes or methods. In one or more embodiments, pellets of the first polyethylene resin and pellets of the second polyethylene resin may be added to a drum tumbler and mixed for a period of time to provide a generally homogeneous mixture of pellets. One or more additives may also be added to the drum tumbler and mixed into the polyethylene composition. The homogeneous mixture of first polyethylene resin pellets and second polyethylene resin pellets may then be added to the feed hopper of the injection molding machine. Further mixing of the first polyethylene resin and the second polyethylene resin may occur in the pressure mechanism, in which the reciprocating screw of the pressure mechanism adds heat and pressure to transition the solid pellets to a molten plastic. The reciprocating screw may then further mix the first polyethylene resin and the second polyethylene resin to obtain the polyethylene composition, which may then be injected into the injection mold.

In other embodiments, a hopper blending system, such as a gravimetric batch blending system, may be used to dispense a desired ratio of first polyethylene resin pellets and second polyethylene resin pellets to the inlet of the pressure mechanism. In a typical hopper blending system, pellets of first polyethylene resin are placed in a first hopper compartment and pellets of the second polyethylene resin may be added to a second hopper compartment. Controlled amounts of each of the first polyethylene resin and the second polyethylene resin may be metered continuously or batchwise into an intermediate hopper or weigh hopper, mixed, and then dispensed to the inlet of the pressure mechanism. The hopper blending system may also be used to add one or more additional components or additives. Use of a hopper blending system may enable precise control of the weight ratio of the first polyethylene resin and the second polyethylene resin in the polyethylene composition and may allow for in-line changes to the weight ratio of the first polyethylene resin and the second polyethylene resin in the polyethylene composition. The ability to change the weight ratio of the first and second polyethylene resins may enable an injection molding operator to make changes to the polyethylene composition in-line to fine-tune the polyethylene composition or to correct for problems encountered at the start-up of or during a campaign or to allow for different polyethylene compositions having different weight ratios of the first and second polyethylene resins to be used for different parts.

In other embodiments, pellets or granules of the first polyethylene resin may be added to the feed hopper of the injection molding apparatus. Pellets or granules of the second polyethylene resin may then be metered directly to the screw of the pressure mechanism of the injection molding apparatus and thoroughly mixed with the first polyethylene resin within the pressure mechanism.

In other embodiments, the first polyethylene resin and the second polyethylene resin may be compounded off-line into the polyethylene composition. A typical off-line compounding process may include providing pellets of the first polyethylene resin, providing pellets of the second polyethylene resin, combining the pellets of the first and second polyethylene resins, transitioning the mixture of resins to a molten state, further mixing the first and second polyethylene resins to obtain the polyethylene composition having a weight ratio of the first polyethylene resin to the second polyethylene resin, extruding the molten polyethylene composition, and re-pelletizing the polyethylene composition. Off-line compounding may be used to produce a single pellet of the polyethylene composition having a predetermined weight ratio the first polyethylene resin and the second polyethylene resin. One or more additives may also be incorporated into the polyethylene composition through compounding.

In other embodiments, the second polyethylene resin may be combined with another resin to form a pelleted masterbatch. In these embodiments, the second polyethylene resin is melt blended to form a polyethylene masterbatch composition that may be formed into pellets, granules, or other solid structures, thereby enabling a polyethylene masterbatch composition having a high predetermined weight ratio of the second polyethylene resin.

In other embodiments, the second polyethylene resin may be incorporated into pellets of the first polyethylene resin during the commercial polymer production process. In these embodiments, the first polyethylene resin, which may be part of a first reaction product from a first polymerization reactor system, may be combined with the second polyethylene resin, which may be part of a second reaction product from a second polymerization reactor system, to form the polyethylene composition, which may then be formed into pellets, granules, or other solid structure. Combining the first polyethylene resin and the second polyethylene resin into the polyethylene composition at the polymer production process may provide a single pellet solution of the polyethylene composition having a specific weight ratio of the first polyethylene resin to the second polyethylene resin.

Injection Molded Article

One or more molded or fabricated articles may be produced from the polyethylene compositions. In some embodiments, the article may be an injection-molded film, an injection-molded article, a blown film, a blow molded article, a thermally-molded article, a compression molded article, a melt-spun fiber, or an extruded article. In one or more embodiments, the article may be an injection molded article comprising the polyethylene composition.

In some embodiments, the article may include a closure device. The closure device may include a bottle cap, a cap, a seal, a filament, a lid or another means for closing or sealing an open-mouthed vessel or container. In one or more embodiments, the polyethylene compositions disclosed herein may be used to make thin injection molded articles, such as lids for example, through injection molding using high cavitation molds. In one or more embodiments, the injection molded articles produced from the polyethylene compositions may have a thickness from 0.1 millimeters (mm) to 2 mm, from 0.1 mm to 1.5 mm, from 0.1 mm to 1.1 mm, from 0.1 mm to 1 mm, 0.1 mm to 0.9 mm, from 0.2 mm to 2 mm, from 0.2 mm to 1.5 mm, from 0.2 mm to 1.1 mm, from 0.2 mm to 1 mm, from 0.2 mm to 0.9 mm, from 0.3 mm to 2 mm, from 0.3 mm to 1.5 mm, from 0.3 mm to 1.1 mm, from 0.3 mm to 1 mm, or from 0.3 mm to 0.9 mm. In one or more embodiments, the injection molded article may have a thickness of from 0.254 mm to 1.016 mm (10 mil to 40 mil). In one or more embodiments, the injection molded article may be a lid.

In one or more embodiments, the polyethylene composition having the first polyethylene resin and the second polyethylene resin may reduce warpage in thin injection molded articles. Without being limited by theory, it is believed that addition of the second polyethylene resin to the first polyethylene resin may improve the flowability of the polyethylene composition into the injection mold, which may result in improved fill and replication of the mold cavity and less induced molded-in stress. Improved fill and reduced molded-in stress in turn may reduce the tendency for warpage of injection molded parts. In one or more embodiments, the improved flowability of the polyethylene composition may reduce the injection pressure required to fill the injection mold. In other embodiments, the improved flowability of the polyethylene composition may reduce the time required to fill the injection mold, thus, reducing the overall cycle time of the injection molding processes. The injection molded articles made from the polyethylene composition may exhibit acceptable ESCR and Gardner Impact performance, which may be equivalent or improved relative to the ESCR and Gardner Impact of injection molded articles made from the first polyethylene resin by itself.

Test Methods

Density

Density is measure in accordance with ASTM D792 and reported in grams/cubic centimeter (g/cc or g/cm$^3$).

Melt Index

Melt index ($I_2$), is measured in accordance with ASTM D1238-10, under conditions of 190° C. and 2.16 kg of load. The melt index ($I_2$) is reported in grams eluted per 10 minutes (g/10 min).

Gel Permeation Chromatography (GPC)

GPC Chromatographic Conditions

The chromatographic system consists of a PolymerChar GPC-IR (Valencia, Spain) high temperature GPC chromatograph equipped with a 4-capillary differential viscometer detector and IR5 fixed wavelength infra-red detector (measurement channel). Data collection is performed using GPCOne™ software from PolymerChar. The system is equipped with an on-line solvent degas device from Agilent Technologies (Santa Clara, Calif., USA). Polyethylene samples are prepared at a 2 mg/mL concentration in 1,2,4-trichlorobenzene solvent by slowly shaking or stirring the sample in TCB at 150° C. for 3 hours. Both the autosampler compartment and the column compartment are operated at 150° C. The columns are 4 Polymer Laboratories (Now Agilent Technologies) Mixed A 30 cm 20-micron columns. The chromatographic solvent is 1,2,4 trichlorobenzene and contains 200 ppm of butylated hydroxytoluene (BHT). The solvent source is nitrogen sparged. The injection volume is 200 microliters and the flow rate is 1.0 milliliters/minute.

Conventional GPC Molecular Weight Measurements

For conventional molecular weight measurements, the GPC column set is calibrated with 21 narrow molecular weight distribution polystyrene standards with molecular weights ranging from 580 to 8,400,000 and are arranged in 6 "cocktail" mixtures with at least a decade of separation between individual molecular weights. The standards are purchased from Agilent Technologies. The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B$$

where M is the molecular weight, A has a value of approximately 0.41 which is determined by the weight-average molecular weight of NIST NBS1475 being equivalent to 52,000 and B is equal to 1.0. A small adjustment to A (from approximately 0.415 to 0.44) was made to correct for column resolution and band-broadening effects such that NIST standard NBS 1475 is obtained at 52,000 g/mol Mw.

A 3$^{rd}$ order polynomial is used to fit the respective polyethylene-equivalent calibration points. PolymerChar GPC One software is used to calculate the polyethylene-equivalent weight-average molecular weight (Mw) and number-average molecular weight (Mn) of the polymer and to determine the molecular weight distribution, MWD or Mw/Mn. The z-average molecular weight, Mz, is also determined. Data was processed using PolymerChar GPC One software. A flowrate marker (decane) is placed in the calibration standards vials as well as the sample vials prior to injection so that flow rate deviations (<1%) could be compensated for.

The total plate count of the GPC column set was performed with Eicosane (prepared at 0.04 g in 50 milliliters of TCB and dissolved for 20 minutes with gentle agitation.) The plate count (Equation 3) and symmetry (Equation 4) were measured on a 200 microliter injection according to the following equations:

$$\text{Plate Count} = 5.54 * \left( \frac{RV_{Peak\,Max}}{\text{Peak Width at } \frac{1}{2} \text{ height}} \right)^2 \quad \text{(Equation 3)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\,tenth\,height} - RV_{Peak\,Max})}{(RV_{Peak\,Max} - \text{Front Peak } RV_{one\,tenth\,height})} \quad \text{(Equation 4)}$$

where RV is the retention volume in milliliters and the peak width is in milliliters, "Peak Max" is the maximum position of the peak, one tenth height is the ¹⁄₁₀ height of the peak maximum, "Rear Peak" refers to the peak tail at later retention volumes relative to the Peak Max, and "Front Peak" refers to the peak front at earlier retention volumes relative to the Peak Max. The plate count for the chromatographic system was greater than 24,000 and symmetry was between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° C. under "low speed" shaking.

The calculations of number-average molecular weight ($Mn_{(GPC)}$), weight-average molecular weight ($Mw_{(GPC)}$), and z-average molecular weight ($Mz_{(GPC)}$) were based on GPC results using the internal IR5 detector (measurement channel) of the PolymerChar GPC-IR chromatograph according to Equations 5-7 below, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 2.

$$Mn_{(GPC)} = \frac{\sum_{i} IR_i}{\sum_{i} (IR_i / M_{polyethylene_i})} \quad \text{(Equation 5)}$$

$$Mw_{(GPC)} = \frac{\sum_{i} (IR_i * M_{polyethylene_i})}{\sum_{i} IR_i} \quad \text{(Equation 6)}$$

$$Mz_{(GPC)} = \frac{\sum_{i} (IR_i * M_{polyethylene_i}^2)}{\sum_{i} (IR_i * M_{polyethylene_i})} \quad \text{(Equation 7)}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(nominal)}$) for each sample by retention volume (RV) alignment of the respective decane peak within the sample ($RV_{(FM\ Sample)}$) to that of the decane peak within the narrow standards calibration ($RV_{(FM\ Calibrated)}$). Any changes in the time of the decane marker peak are then assumed to be related to a linear-shift in flowrate ($Flowrate_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. Processing of the flow marker peak was done via the PolymerChar GPCOne™ Software. Acceptable flowrate correction is such that the effective flowrate should be within +/−2% of the nominal flowrate.

$$Flowrate_{(effective)} = Flowrate_{(nominal)} * (RV_{(FM\ Calibrated)} / RV_{(FM\ Sample)}) \quad \text{(Equation 8)}$$

Absolute GPC Molecular Weight Measurements

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mol.

Universal Calibration GPC Molecular Weight Measurements

Universal Calibration molecular weight calculations were performed from the in-line viscometer detector and IR5 detector (measurement channel) and the polystyrene calibrants using PolymerChar GPCOne™ software.

The Absolute and Universal Calibration molecular weight moments (Mn(abs), Mw(abs), Mz(abs) and Mn(uc), Mw(uc), Mz(uc)) are calculated using the absolute and true polyethylene molecular weights as determined by each respective technique at each chromatographic point (i), substituted in place of the homopolymer-polyethylene equivalent molecular weights using equations 5-7 using PolymerChar GPCOne' software.

Environmental Stress Crack Resistance (ESCR)

ESCR was measured using a Crisco™ oil bend lid test. This test is an indicator of the resins ability to withstand cracking when used with certain products. Since many lids are used in the presence of oils or fats, the test gives a very good indication of a lid's ability to resist cracking. In the test, the lid is bent back over itself and held together with a clip. The lid is then immersed in the Crisco™ oil and allowed to stand. The amount of time is recorded from the time of immersion until the first crack appears along the fold. This can vary from minutes to days depending on the resin. The ESCR value reported is the average time to failure for ten (10) parts that were tested for each composition molded.

Gardner Impact

The Gardner Impact for the injection molded articles was measured according to ASTM D5420, which is incorporated by reference herein in its entirety. A Gardner Heavy Duty Variable Height Impact Tester (IG-1120) manufactured by BYK-Gardner USA, Columbia, Md., USA, fitted with a two (2) pound tup (i.e., weight) was used to test for impact strength.

EXAMPLES

Comparative Example 1

As a comparative sample, an injection molding process was operated using a control polyethylene composition comprising 100 wt. % of the first polyethylene resin. DOW' LLDPE DNDA-1082 NT 7, a LLDPE formulation supplied by The Dow Chemical Co., Midland, Mich., was used for the first polyethylene resin. The first polyethylene resin had a measured density of 0.932 g/cc and a measured melt index of 162.6 g/10 min. Pellets of the first polyethylene resin were added to the hopper of a 225 metric ton, 8.5 ounce shot capacity Husky injection molding machine (serial number 10531). The Husky injection molding machine was equipped with a hot-runner and a two-cavity mold, manufactured by Tradesco Mold Ltd., for producing six-inch diameter lids having an average panel thickness of 0.025 inches.

The injection molding process was operated with the control polyethylene composition under various conditions to establish baseline operating conditions for producing the best appearing part with respect to panel flatness, part weight, ESCR, and Gardner Impact with the shortest cycle time. The baseline operating conditions of the injection molding process established using a polyethylene composition comprising 100 wt. % of the first polyethylene resin are provided below in Table 1. Table 1 also includes the part weight, as molded density, ASTM density, melt index, bent lid ESCR, and Gardner Impact measured for the finished lids obtained from the injection molding process for Comparative Example 1. The finished lids were also visually inspected for warpage.

TABLE 1

Baseline Operating Conditions for the Injection Molding Process of Example 1 and Properties of the Injection Molded Lids Produced Therefrom Injection Molding Baseline Operating Conditions

| Operating Condition | Baseline Value |
| --- | --- |
| Shot Size - millimeters (mm) | 40 |
| Melt Temperature - degrees Celsius (° C.) | 254 |
| Oil Temperature - ° C. | 43 |
| Hot Runner Temperature - ° C. | 216 |
| Fill Time - seconds (sec) | 0.09 |
| Injection Pressure - kilopascals (kPa) | 6226 |
| Fill Speed - % | 100 |
| Transfer Position - mm | 26 |
| Hold Pressure - % of Maximum Hydraulic Pressure | 29 |
| Hold Time - sec | 5 |
| Cooling Time - sec | 2 |
| Mold Cooling Temperature - ° C. | 18 |
| Mold Tips - % | 0 |
| Hydraulic Pressure - kPa | 10687-11101 |
| Total Cycle Time - sec | 10.78 |

Finished Lid Properties

| Property | Measured Value |
| --- | --- |
| Part Weight - grams (g) | 17.7 |
| As Molded Density - g/cc | 0.9288 |
| ASTM Density - g/cc | 0.9342 |
| Melt Index ($I_2$) - g/10 min | 149.2 |
| Bent Lid ESCR - minutes (min) | 45.4 |
| Gardner Impact - Newton meters (Nm) at 23° C. | 1.45 |
| Warpage by Visual Inspection (Yes/No) | Yes |

Example 2: Polyethylene Compositions

Polyethylene compositions, which included the first polyethylene resin and the second polyethylene resin, were prepared and injection molded into articles using the injection molding process of Example 1. In the polyethylene compositions of Example 2, DOW™ LLDPE DNDA-1082 NT 7, a LLDPE formulation supplied by The Dow Chemical Co., Midland, Mich., was used for the first polyethylene resin, and DOW AFFINITY™ GA-1950, a polyolefin elastomer formulation supplied by The Dow Chemical Company, Midland, Mich. was used for the second polyethylene resin. As previously described, the first polyethylene resin had a measured density of 0.932 g/cc and a measured melt index ($I_2$) of 162.6 g/10 min. The second polyethylene resin had a target density of 0.874 g/cc and a melt index ($I_2$) of from 500 g/10 min to 1250 g/10 min.

The polyethylene compositions were prepared by weighing out a quantity of pellets of the first polyethylene resin and a quantity of pellets of the second polyethylene resin. The weighed quantities of the first polyethylene resin and the second polyethylene resins were added to a drum tumbler mixer and tumbled for a period of time sufficient to attain a good physical mixture of the pellets. Polyethylene compositions having 2.5 wt. % of the second polyethylene resin, 5 wt. % of the second polyethylene resin, and 10 wt. % of the second polyethylene resin were prepared and processed in the injection molding process. The resulting polyethylene compositions had a weight ratio of the second polyethylene resin to the first polyethylene resin of 2.5:97.5, 5:95, and 10:90, respectively.

The molecular weight distributions of each of the polyethylene compositions of Example 2 were determined using the chromatographic system and GPC methods previously described in this disclosure. Table 2 provides the Conventional GPC molecular weight measurements for each of the polyethylene compositions of Example 2 and Comparative Example 1 using the Conventional GPC method previously described. Table 3 provides the Absolute GPC molecular weight measurements for each of the polyethylene compositions of Example 2 and Comparative Example 1 obtained using the Absolute GPC method previously described. Table 4 provides Universal Calibration GPC molecular weight measurements for each of the polyethylene compositions of Example 2 and Comparative Example 1 obtained using the Universal Calibration GPC method previously described. The molecular weights in Tables 2-4 are provided in grams per mole (g/mol).

TABLE 2

Conventional GPC Molecular Weight Measurement Data for the Polyethylene Compositions of Example 2 and Comparative Example 1
Molecular Weight Distribution - Conventional GPC

| Formulation | $Mn_{(GPC)}$ | $Mw_{(GPC)}$ | $Mz_{(GPC)}$ | $Mw_{(GPC)}/Mn_{(GPC)}$ |
| --- | --- | --- | --- | --- |
| Comparative Example 1 | 7,730 | 31,100 | 113,000 | 4.02 |
| 2.5% Second PE Resin | 7,740 | 30,900 | 119,000 | 4.00 |
| 5% Second PE Resin | 7,600 | 30,600 | 112,000 | 4.03 |
| 10% Second PE Resin | 7,880 | 30,100 | 105,000 | 3.82 |
| 100% Second PE Resin | 10,100 | 22,100 | 37,100 | 2.20 |

TABLE 3

Absolute GPC Molecular Weight Measurement Data for the Polyethylene Compositions of Example 2 and Comparative Example 1
Molecular Weight Distribution - Absolute GPC

| Formulation | $Mn_{(ABS)}$ | $Mw_{(ABS)}$ | $Mw_{(ABS)}/Mw_{(GPC)}$ | $Mz_{(ABS)}$ | $Mz_{(ABS)}/Mw_{(ABS)}$ |
| --- | --- | --- | --- | --- | --- |
| Comparative Example 1 | 7,430 | 34,500 | 1.11 | 639,000 | 18.5 |
| 2.5% Second PE Resin | 7,540 | 37,900 | 1.23 | 848,000 | 22.4 |
| 5% Second PE Resin | 7,900 | 35,900 | 1.17 | 702,000 | 19.6 |

TABLE 3-continued

Absolute GPC Molecular Weight Measurement Data for the Polyethylene Compositions of Example 2 and Comparative Example 1
Molecular Weight Distribution - Absolute GPC

| Formulation | $Mn_{(ABS)}$ | $Mw_{(ABS)}$ | $Mw_{(ABS)}/Mw_{(GPC)}$ | $Mz_{(ABS)}$ | $Mz_{(ABS)}/Mw_{(ABS)}$ |
|---|---|---|---|---|---|
| 10% Second PE Resin | 8,380 | 37,500 | 1.25 | 652,000 | 17.4 |
| 100% Second PE Resin | 11,400 | 27,100 | 1.22 | 47,400 | 1.80 |

TABLE 4

Universal Calibration GPC Molecular Weight Measurement Data for the Polyethylene Compositions of Example 2 and Comparative Example 1
Molecular Weight Distribution - Universal Calibration GPC

| Formulation | $Mn_{(UC)}$ | $Mw_{(UC)}$ | $Mz_{(UC)}$ | $Mw_{(UC)}/Mn_{(UC)}$ | $Mz_{(UC)}/Mw_{(UC)}$ | $Mw_{(UC)}/Mw_{(GPC)}$ |
|---|---|---|---|---|---|---|
| Comparative Example 1 | 8,120 | 32,900 | 178,000 | 4.01 | 5.40 | 1.06 |
| 2.5% Second PE Resin | 8,470 | 33,300 | 231,000 | 3.84 | 6.95 | 1.08 |
| 5% Second PE Resin | 8,530 | 32,400 | 173,000 | 3.76 | 5.35 | 1.06 |
| 10% Second PE Resin | 8,620 | 31,700 | 145,000 | 3.63 | 4.57 | 1.05 |
| 100% Second PE Resin | 12,700 | 27,000 | 43,400 | 2.12 | 1.60 | 1.22 |

For each polyethylene composition, the mixture of pellets of the first and second polyethylene resins were added to the feed hopper of the injection molding machine described in Example 1. The injection molding process of Example 1 was then operated to produce injection molded lids for each of the polyethylene compositions of Example 2. The baseline operating conditions in Example 1 were used for the base cycle of the injection molding process for each of the polyethylene compositions of Example 2. In subsequent cycles of the injection molding process for each polyethylene composition, adjustments were made to the cooling time to achieve qualitatively acceptable panel flatness, and adjustments were made to the cycle time, hold pressure, and transfer position to prevent mold flashing. Other critical operating conditions and parameters were monitored and recorded.

The final operating conditions for each of the polyethylene compositions are provided below in Table 5, along with the baseline operating conditions for comparative Example 1. Table 5 also includes the part weight, as molded density, ASTM density, melt index, bent lid ESCR, and Gardner Impact measured for the finished lids obtained from the injection molding process for each of the polyethylene compositions. The finished lids were also visually inspected for warpage.

TABLE 5

Operating Conditions and Injection Molded Lid Properties of the Polyethylene Compositions of Example 2 Compared to the Comparative Example 1

| | | Polyethylene Compositions of Example 2 | | |
|---|---|---|---|---|
| Operating Condition | Comparative Example 1 | 2.5 wt. % Second PE Resin | 5 wt. % Second PE Resin | 10 wt. % Second PE Resin |
| First PE Resin - wt. % | 100 | 97.5 | 95 | 90 |
| Second PE Resin wt. % | 0 | 2.5 | 5 | 10 |
| Shot Size - mm | 40 | 40 | 40 | 40 |
| Melt Temperature -° C. | 254 | 254 | 254 | 253 |
| Oil Temperature - ° C. | 43 | 43 | 43 | 42 |
| Hot Runner Temperature - ° C. | 216 | 216 | 216 | 216 |
| Fill Time - sec | 0.09 | 0.09 | 0.09 | 0.08 |
| Injection Pressure - kPa | 6226 | 6226 | 5122 | 4385 |
| Fill Speed - % | 100 | 100 | 100 | 100 |
| Transfer Position - mm | 26 | 26 | 26 | 27 |
| Hold Pressure - % of Max Hydraulic Pressure | 29 | 29 | 23 | 21 |
| Hold Time - sec | 5 | 3 | 4 | 4 |
| Cooling Time - sec | 2 | 1 | 1 | 1 |
| Mold Cooling Temp - ° C. | 18 | 18 | 18 | 18 |

TABLE 5-continued

Operating Conditions and Injection Molded Lid Properties of the Polyethylene Compositions of Example 2 Compared to the Comparative Example 1

| | | | | |
|---|---|---|---|---|
| Mold Tips - % | 0 | 0 | 0 | 0 |
| Hydraulic Pressure - kPa | 10687-11101 | 10687-11101 | 10687-11101 | 10687-11101 |
| Total Cycle Time - sec | 10.78 | 7.81 | 8.8 | 8.78 |

| | Measured Properties of Finished Lid | | | |
|---|---|---|---|---|
| Property | Comparative Example 1 | 2.5 wt. % Second PE Resin | 5 wt. % Second PE Resin | 10 wt. % Second PE Resin |
| Part Weight - g | 17.7 | 18.2 | 17.0 | 16.9 |
| As Molded Density - g/cc | 0.9288 | 0.9283 | 0.9272 | 0.9246 |
| ASTM Density - g/cc | 0.9342 | 0.9331 | 0.9323 | 0.9316 |
| Melt Index ($I_2$) - g/10 min | 149.2 | 154.9 | 156.2 | 167.6 |
| Bent Lid ESCR - min | 45.4 | — | 86.2 | 83 |
| Gardner Impact - Nm at 23° C. | 1.45 | 1.59 | 1.49 | 1.45 |
| Warpage as Inspected Visually (Yes/No) | Yes | No | No | No |

As shown in Table 5, the articles made with the polyethylene compositions of Example 2 produced acceptable articles free of warpage and exhibited greater ESCR and improved or unaffected Gardner Impact performance than the articles of Comparative Example 1 made with 100% of the first polyethylene resin. Addition of the second polyethylene resin also increased the melt index ($I_2$) of the polyethylene compositions. Utilizing the polyethylene compositions of Example 2 in the injection molding process also resulted in decreases in the injection pressure, hold pressure, and overall cycle time necessary to produce an article of comparable quality to Comparative Example 1 and free of warpage. The polyethylene composition comprising 2.5 wt. % of the second polyethylene composition exhibited a 28% reduction in cycle time to 7.81 seconds per cycle as compared to the performance of Comparative Example 1. The polyethylene composition comprising 5 wt. % of the second polyethylene resin exhibited an 18% reduction in the injection pressure to 5122 kPa, a 21% reduction in the hold pressure to a hold pressure of 23% of the injection pressure, and an 18% reduction in cycle time to 8.8 seconds as compared to the performance of Comparative Example 1. The polyethylene composition comprising 10 wt. % of the second polyethylene resin exhibited a 30% reduction in the injection pressure to 4385 kPa, a 28% reduction in the hold pressure to a hold pressure of 21% of the injection pressure, and a 19% reduction in cycle time to 8.78 seconds as compared to the performance of Comparative Example 1.

The data in Table 5 for the polyethylene compositions of Example 2 indicate that the injection pressure and hold pressure tend to decrease with increasing weight percent of the second polyethylene resin. The cycle time decreased with the addition of 2.5 wt. % of the second polyethylene resin, but then remained generally constant with increasing weight percent of the second polyethylene resin. This may suggest that adding small amounts of the second polyethylene resin may lead to reductions in operating pressures and reduced cycle times.

Throughout this disclosure ranges are provided for various properties of the polyethylene compositions, first polyethylene resin, and second polyethylene resin. It will be appreciated that when one or more explicit ranges are provided the individual values and the ranges formed therebetween are also intended to be provided, as providing an explicit listing of all possible combinations is prohibitive. For example, a provided range of 1-10 also includes the individual values, such as 1, 2, 3, 4.2, and 6.8, as well as all the ranges which may be formed within the provided bounds, such as 1-8, 2-4, 6-9, and 1.3-5.6.

It should now be understood that various aspects of the polyethylene compositions and articles made with the polyethylene compositions are described and such aspects may be utilized in conjunction with various other aspects. It should also be understood to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

The invention claimed is:

1. A polyethylene composition comprising:
   a first polyethylene resin having a density of from 0.915 g/cc to 0.970 g/cc and a melt index ($I_2$) from 10 g/10 min to 200 g/10 min, when measured according to ASTM D1238 at 190° C. and 2.16 kg load; and
   a second polyethylene resin having a density of from 0.860 g/cc to 0.930 g/cc, a melt index ($I_2$) of from 400 g/10 min to 2000 g/10 min, and a MWD of less than or equal to 3.5, wherein the MWD is defined as $M_w/M_n$ with $M_w$ being a weight average molecular weight and $M_n$ being a number average molecular weight;
   wherein the density of the first polyethylene resin is greater than the density of the second polyethylene resin and the first polyethylene resin, the second polyethylene resin, or both are copolymers of ethylene monomer and at least one α-olefin comonomer, the α-olefin comonomer including $C_3$-$C_{12}$ α-olefins.

2. The polyethylene composition of claim 1, wherein the first polyethylene resin has a density from 0.920 g/cc to 0.960 g/cc.

3. The polyethylene composition of claim 1, wherein the second polyethylene resin has a density from 0.860 g/cc to 0.915 g/cc.

4. The polyethylene composition of claim 1, wherein the first polyethylene resin has a Molecular Weight Distribution (MWD) of from 2 to 5.

5. The polyethylene composition of claim 4, wherein the polyethylene composition comprises 2 wt. % to 20 wt. % of the second polyethylene resin.

6. The polyethylene composition of claim 4, wherein the polyethylene composition comprises 80 wt. % to 98 wt. % of the first polyethylene resin.

7. The polyethylene composition of claim 4, wherein the melt index ($I_2$) of the first polyethylene resin is from 20 g/10 min to 180 g/10 min.

8. The polyethylene composition of claim 4, wherein the melt index ($I_2$) of the second polyethylene resin is from 400 g/10 min to 1500 g/10 min.

9. The polyethylene composition of claim 1, wherein the polyethylene composition comprises 2 wt. % to 20 wt. % of the second polyethylene resin.

10. The polyethylene composition of claim 1, wherein the polyethylene composition comprises 80 wt. % to 98 wt. % of the first polyethylene resin.

11. The polyethylene composition of claim 1, wherein the melt index ($I_2$) of the first polyethylene resin is from 20 g/10 min to 180 g/10 min.

12. The polyethylene composition of claim 1, wherein the melt index ($I_2$) of the second polyethylene resin is from 400 g/10 min to 1500 g/10 min.

13. An injection molded article produced from the polyethylene composition of claim 1.

14. The injection molded article of claim 13, wherein the injection molded article is a lid.

15. The injection molded article of claim 13, wherein a thickness of the injection molded article is from 10 mil to 40 mil.

16. A polyethylene composition comprising:
a first polyethylene resin having a density of from 0.915 g/cc to 0.970 g/cc, a melt index ($I_2$) from 10 g/10 min to 200 g/10 min, when measured according to ASTM D1238 at 190° C. and 2.16 kg load, and a Molecular Weight Distribution (MWD) of from 2 to 5, wherein the MWD is defined as $M_w/M_n$ with $M_w$ being a weight average molecular weight and $M_n$ being a number average molecular weight; and
a second polyethylene resin having a density of from 0.860 g/cc to 0.930 g/cc and a melt index ($I_2$) of from 400 g/10 min to 2000 g/10 min;
wherein the density of the first polyethylene resin is greater than the density of the second polyethylene resin and the first polyethylene resin, the second polyethylene resin, or both are copolymers of ethylene monomer and at least one α-olefin comonomer, the α-olefin comonomer including $C_3$-$C_{12}$ α-olefins.

17. The polyethylene composition of claim 16, wherein the first polyethylene resin has a density from 0.920 g/cc to 0.960 g/cc.

18. The polyethylene composition of claim 16, wherein the second polyethylene resin has a density from 0.860 g/cc to 0.915 g/cc.

19. The polyethylene composition of claim 16, wherein the polyethylene composition comprises 2 wt. % to 20 wt. % of the second polyethylene resin.

20. The polyethylene composition of claim 16, wherein the melt index ($I_2$) of the second polyethylene resin is from 400 g/10 min to 1500 g/10 min.

* * * * *